Sept. 29, 1953   W. A. FLETCHER ET AL   2,653,376
METHOD OF MAKING UNITARY MAGNETIC POLE PIECES
Filed April 2, 1949   2 Sheets-Sheet 1

INVENTORS
WILLIAM A. FLETCHER
& CARL L. CLEVENGER
By Spencer Hardman & Fehr
their ATTORNEYS Sept. 29, 1953 W. A. FLETCHER ET AL 2,653,376
METHOD OF MAKING UNITARY MAGNETIC POLE PIECES
Filed April 2, 1949 2 Sheets-Sheet 2
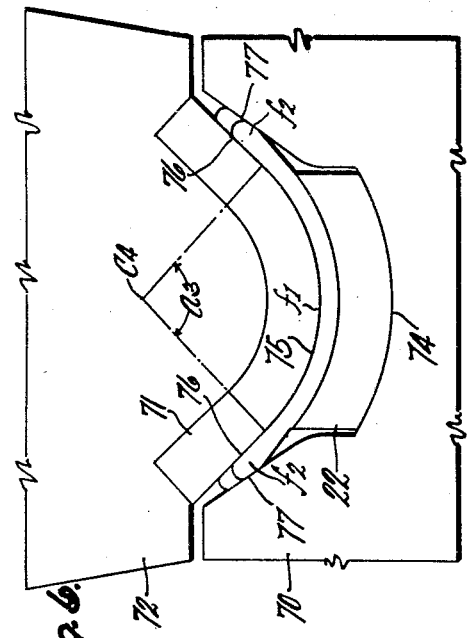
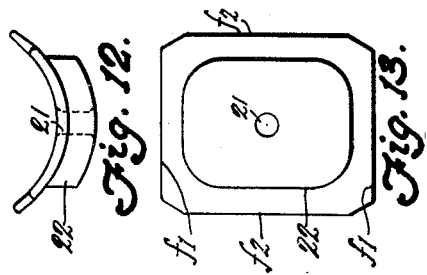
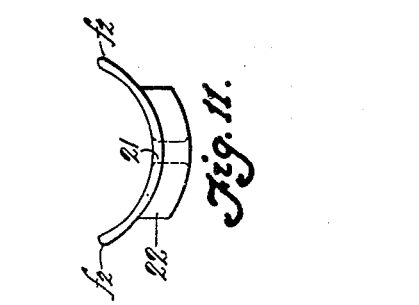
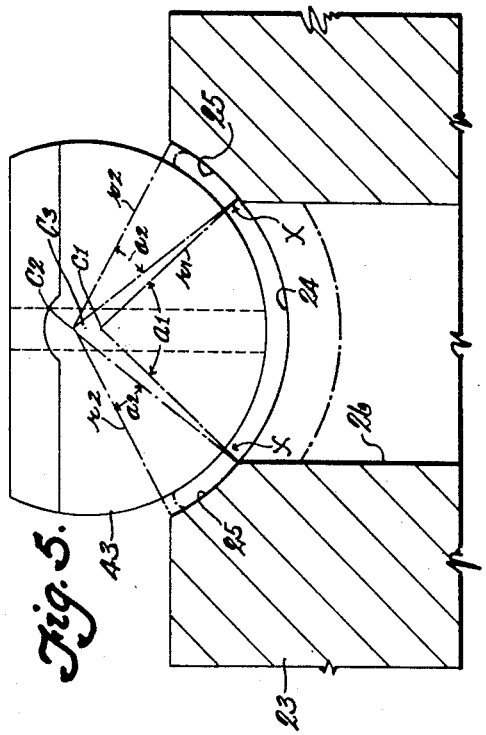
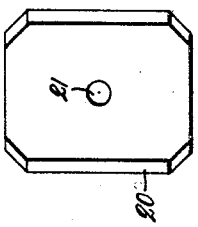
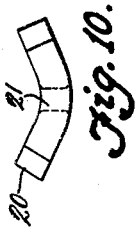
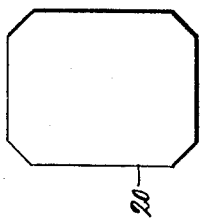
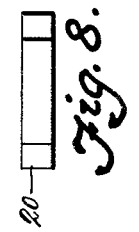
INVENTORS
WILLIAM A. FLETCHER
& CARL L. CLEVENGER
BY
Spencer Hartman + Fehr
Their ATTORNEYS Patented Sept. 29, 1953

2,653,376

UNITED STATES PATENT OFFICE 2,653,376

METHOD OF MAKING UNITARY MAGNETIC POLE PIECES

William A. Fletcher, Daleville, and Carl L. Clevenger, Anderson, Ind., assignors to General Motors Corporation, Detroit, Mich., a corporation of Delaware Application April 2, 1949, Serial No. 85,146

2 Claims. (Cl. 29—155.5)

1

This invention relates to pole shoes for dynamo electric machines and its object is to provide a method and apparatus for making, without machining operation, a pole shoe having a pole face portion of the desired shape and a field coil receiving shank whose side and end surfaces are spaced inwardly from the side and ends of the face by bending a flat blank of soft steel into arcuate shape and by causing the blank to be forced by a die which engages its concave surface against a die having surfaces which engage those portions of the convex surface of the blank which are adjacent the periphery thereof, the central portion of the convex surface spaced from the periphery being unsupported by reason of a hole in the second die into which a part of the blank is forced to provide a pole piece shank while the portions between the dies are shaped to provide a flange which extends from the shank portion to form peripheral portions of the pole face. The pole shoe thus formed is squeezed between sizing dies which render the concave and convex surfaces now nearly concentric and determine the radial distance between them and which complete the shaping of flange portions.

Further objects and advantages of the present invention will be apparent from the following description, reference being had to the accompanying drawings wherein a preferred emobdiment of the present invention is clearly shown.

In the drawings:

Fig. 1 which is a sectional view on line 1—1 of Fig. 2, and Fig. 2 which is a sectional view on the line 2—2 of Fig. 1, show the dies which shape a blank into approximately the shape required for a pole shoe.

Fig. 5 is a view on a larger scale than the preceding figures showing, in section, the lower die member and in end elevation the upper die member and between them, a formed pole shoe indicated by dot-dash line.

Figure 4:
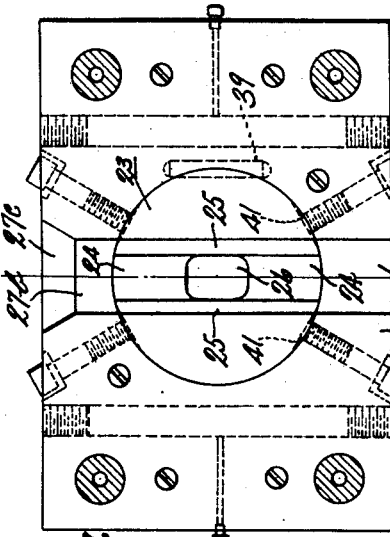
Fig. 4 is a view of the lower die member taken on the line and in the direction of arrows 4, 4 of Fig. 2.

Fig. 6 drawn to the same scale as Fig. 5 is a fragmentary end view of the coining dies with a shaped pole shoe between them.

Figs. 7 and 8 are plan and end views, respectively, of a blank to be used in forming the pole shoes.

Figs. 9 and 10 are plan and end views, respectively, of a blank after being bent into arcuate

2 shape preparatory to shaping by the dies shown in Figs. 1 to 5.

Fig. 11 is an end view of the pole shoe after being shaped by the dies shown in Figs. 1 to 5.

Fig. 12 is an end view of the pole shoe after being sized by the dies shown in Fig. 6.

Fig. 13 is a view in the direction of arrow 13 of Fig. 12.

A blank 20 of the shape shown in Figs. 7 and 8 is cut from a steel bar and is bent into arcuate form as shown in Figs. 9 and 10 and a central hole 21 is formed therein by a punching operation. The convex face of the blank has approximately the curvature of the inner cylindrical surface of the field frame to which the pole shoe is to be attached. The concave face of the blank has approximately the curvature of the pole face required for the armature that is to rotate within that field frame.

The next operation is performed upon the blank by dies 23 and 43, shown in Figs. 1-5. Die 23, formed from a cylindrical block of metal, has a cylindrical concave surface 24 whose axis of curvature is represented by point C1 (Fig. 5), whose radius is $r_1$ and whose subtended angle is $a_1$. The surface 24 is midway between two like cylindrical, concave surfaces 25 whose axis of curvature is represented by point C2, whose radius is $r_2$ and whose subtended angle is $a_2$. Through the surface 24, the die 23 has a hole 26, which determines the shape of the shank 22 (Figs. 5, 11-13) of the pole shoe. The surfaces 25 are close to the sides of hole 26. The die 23 is received by a cylindrical bore in a plate 27 which screws 28 attach to a plate 29 retained upon the base 30 of a hydraulic press by clamps 31 which screws 32 attach to the base. Plate 27 has a cylindrical surface 27a upon which the blank is received as it is pushed upon the die 23, and a cylindrical surface 27b for receiving the swaged pole shoe as it is pushed away from die 23. Downwardly inclined surface 27c directs the pole shoe into a container. Die 23 rests upon a spacer disc 33 having a central hole 34 for receiving a knock-out pin 35 guided by the plate 29 and adapted to be moved upwardly by a mechanically operated rod 36 so as to engage an ejector bar 37 received by hole 26. The angular position of parts 23 and 33 is determined by a key 38 received by a slot 39 in plate 27 and engaging flats guided by parts 33 and 23. Screws 40 threaded through plate 27 engage flats 41 on die 23 to secure it firmly in position. Plates 27 and 29 support pilot rods 42. The head 50 of a hydraulic press which actuates the die 43 receives screws 51 which secure clamps 52 which fix a plate 53 to the head. Screws 54 connect plate 53 with a plate 55 for supporting a block 56 to which the die 43 is attached by clamps 57 and screws 58. The block 56 is provided with a groove 59 in which the die 43 is fastened. Die 43 supports a pilot pin 60, the head of which engages the block 56. A key 61 received by a slot 62 in block 46 and by a notch in the flange of block 56 locates the latter block in such position that the axis of the cylindrical die 43, whose axis of curvature is represented by point C3 in Fig. 5, will be in vertical alignment with the axes of C1 and C2 of the surfaces 24 and 25 respectively of die 23. Plate 53 has clearance holes 63 and plate 55 has bushings 64 for receiving the pilot rods 42.

Figure 2:
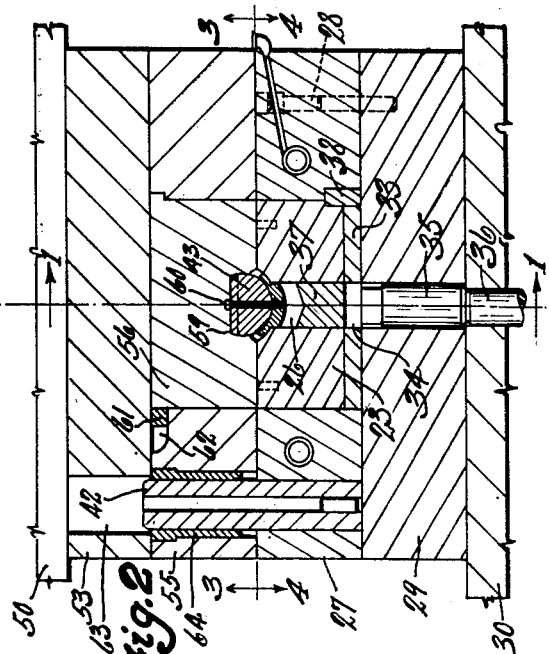
Figure 3:
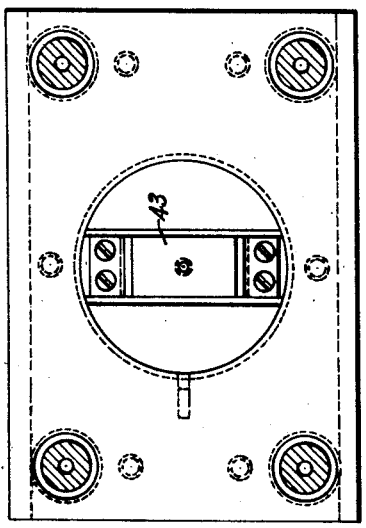
Fig. 3 is a view of the upper die member taken on the line and in the direction of arrows 3, 3 of Fig. 2.
Figure 1:
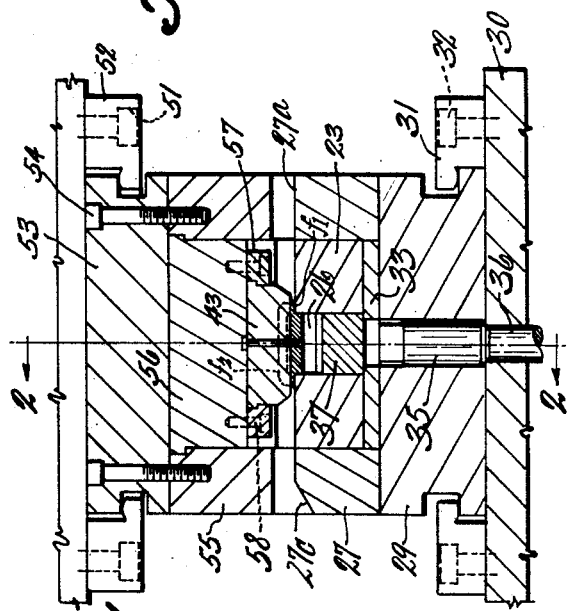

While the dies are separated, the blank shaped as shown in Figs. 9 and 10, is placed convex side down upon the surface 24 of die 23 and centrally thereof so that the hole 21 therein will be approximately in alignment with the pin 60 which has a rounded lower end. The upper die 43 is lowered against the blank and the pin 60 enters the hole 21 to center it accurately. The pressure applied by the die is sufficient to cause the central portion of the blank extending between the sides and the ends of the hole 26 to be forced in the hole to form the shank 22 of the pole shoe while the supported portions extending beyond the sides of hole 26 are squeezed between the dies to cause the metal to flow to form a flange having end portions $f1$ (Fig. 1) and side portions $f2$ merging with the end portions as shown in Figs. 1 and 2. The general thickness of the flange is determined by the extent of the downward movement of the die 43 which is determined by a stop which limits the downward movement of the press head. The thickness of the flanges at the region denoted by arrows $x$ in Fig. 5 is less than at other portions of the flanges, this difference being determined by the relation of the surfaces of the dies 23 and 43. The thickness at $x$ may be, for example, $\frac{1}{8}''$ as required by the pole shoe designer. In order to avoid cracking of the end flange portions between the regions $x$, those portions are shaped to provide thickness which increases toward the middle to about $\frac{5}{32}''$, for example.

When the press head 50 is raised, the rod 36 is raised to cause pin 35 and bar 37 to rise to lift the shoe above the die 23 to permit pushing the shoe out upon the surfaces 27b and 27c of plate 27.

The pole shoe is then placed between sizing dies 70 and 71 supported by the head and bed respectively, of another hydraulic press, not shown. The die 71 is attached to a block 72 carried by the press head. Die 70 has a concave surface 74 for receiving the convex face of the pole shoe and die 71 has a convex surface 75 adapted to engage the concave face of the pole shoe. Surface 75 subtends angle $a3$ from point C4 which represents the axis of curvature of surface 75. Surface 75 merges with tangent plane surfaces 76. Die 70 provides surfaces 77 oblique to surfaces 76. When die 71 is lowered completely to a position which the radial thickness of the pole shoe determines, the axes of curvature of surfaces 74 and 75 become coincident so that the convex and concave faces of the pole shoe become more nearly exactly concentric. At the same time the pole tip portions of the shoe which the side flange portions $f2$ provide are compressed into wedge-like shape. This deformation causes a slight flow of the metal which so conditions the tip portions that they do not spring back (upwardly in Fig. 6) when the die pressure is relieved. Thus the outer plane surfaces of the pole face remain tangent to the concave cylindrical surfaces thereof.

After the sizing operation the central hole 21 in the pole shoe is tapped to receive a screw for attaching the convex surface of its shank 21 to the inner cylindrical surface of a field frame of a dynamo electric machine after a field coil has been placed around its shank.

While the embodiment of the present invention as herein disclosed, constitutes a preferred form, it is to be understood that other forms might be adopted.

What is claimed is as follows:

1. In the method of making a unitary magnetic pole piece, having a shank portion thereon, from a flat blank of soft steel, the steps comprising, bending a flat blank of soft steel to an arcuate form, simultaneously piercing a central hole therein, centering the blank in a die by placing a centering rod through said hole, holding the peripheral portions only of the blank by supporting the blank at its peripheral portions only thereof, swaging and drawing metal from said supported blank into the central portion thereof forming a shank, removing the thus formed blank, and finally coining the opposed reduced outer portions of the arcuate portion thereof to taper them outwardly from the center.

2. The method of making a unitary magnetic pole shoe having a shank portion thereon adapted to receive a coil wherein said shoe is formed from a single piece of flat soft steel, the steps comprising; bending a flat blank of soft steel into an arcuate form, clamping said arcuate blank adjacent the peripheral portions only thereof while permitting the central portion thereof to remain unsupported, swaging and drawing said blank in such held and supported position and thus causing metal to flow into the unsupported portion and thereby thicken said portion into a shank, and then coining the opposed reduced outer portions of the arcuate portion thereof to taper them outwardly from the center.

WILLIAM A. FLETCHER.
CARL L. CLEVENGER.

References Cited in the file of this patent

UNITED STATES PATENTS

| Number | Name | Date |
|---|---|---|
| 92,494 | Van Anden | July 13, 1869 |
| 1,297,271 | Stevens | Mar. 11, 1919 |
| 1,494,411 | Bidle | May 20, 1924 |
| 1,947,867 | Mebold (A) | Feb. 20, 1934 |
| 1,994,480 | Larsen | Mar. 19, 1935 |
| 2,239,331 | Mebold (B) | Apr. 22, 1941 |
| 2,473,371 | Heath | June 14, 1949 |